(12) United States Patent
Acosta et al.

(10) Patent No.: US 6,290,135 B1
(45) Date of Patent: Sep. 18, 2001

(54) MULTIPLE SOURCE/DENSE PATTERN OPTICAL SCANNER

(75) Inventors: Jorge L. Acosta; Robert W. Rudeen, both of Eugene, OR (US)

(73) Assignee: PSC Scanning, Inc., Eugene, OR (US)

( * ) Notice: Subject to any disclaimer, the term of this patent is extended or adjusted under 35 U.S.C. 154(b) by 0 days.

(21) Appl. No.: 09/360,039

(22) Filed: Jul. 23, 1999

(51) Int. Cl.[7] ....................................................... G06K 7/10
(52) U.S. Cl. ..................... 235/472.01; 235/462.12; 235/462.38
(58) Field of Search .................. 235/462.12, 462.38, 235/472.01

(56) References Cited

U.S. PATENT DOCUMENTS

| | | |
|---|---|---|
| 4,678,288 | 7/1987 | Lonsdale et al. . |
| 4,694,182 | 9/1987 | Howard . |
| 4,786,798 | 11/1988 | Lonsdale . |
| 5,007,691 | 4/1991 | Bobba et al. . |
| 5,457,308 | * 10/1995 | Spitz et al. ................. 235/462.12 |
| 5,841,121 | * 11/1998 | Koenck ....................... 235/472.01 |
| 5,921,421 | * 7/1999 | Cherry et al. ............... 235/462.12 |

* cited by examiner

*Primary Examiner*—Harold I. Pitts
(74) *Attorney, Agent, or Firm*—Lyon & Lyon LLP

(57) ABSTRACT

A method of and a system for generating a dense pattern of scan lines. In a preferred configuration, multiple laser beams are formed and directed along offset outgoing paths onto a scanning mechanism such as a polygon mirror which scans the beams across pattern mirrors to generate simultaneous scan patterns out into the scan volume. Return light from both scan patterns are retrodirectively collected and redirected by a common collection element such as a collection lens. The collection lens focuses return light from the first beam onto a first detector and light from the second beam onto a second detector, the first and second detectors being offset in corresponding fashion to the offset of the outgoing beams.

14 Claims, 12 Drawing Sheets

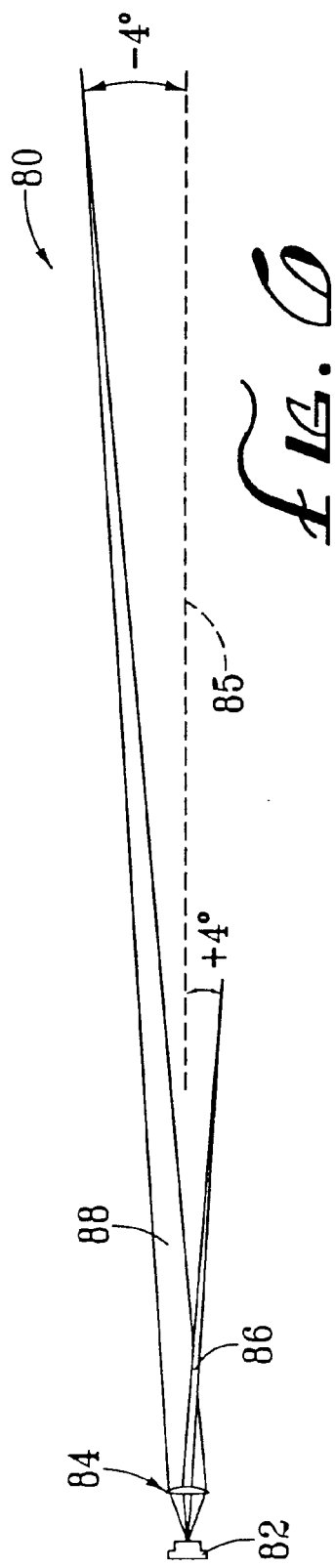
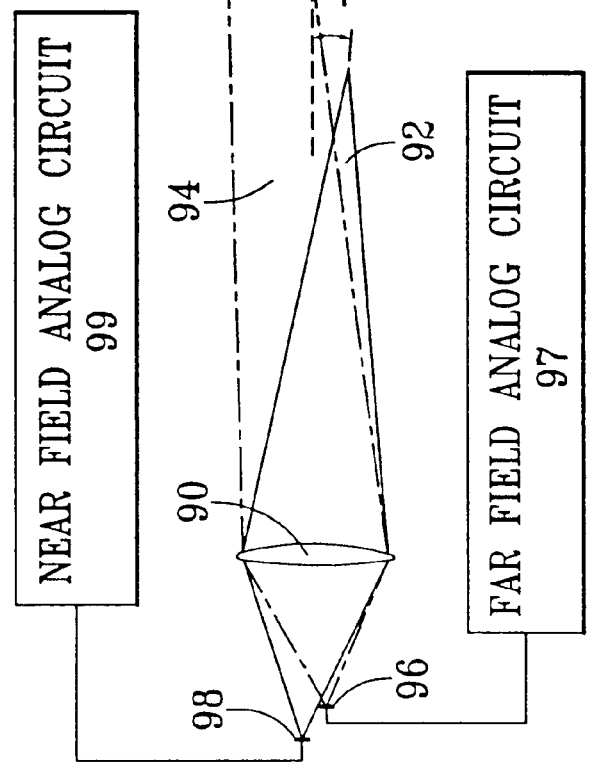

MULTIPLE SOURCE/DENSE PATTERN OPTICAL SCANNER

BACKGROUND OF THE INVENTION

The field of the present invention relates to data reading systems. In particular, an optical scanning and method for optical scanning are described herein for creating for creating a dense scan pattern with potentially a wide range of reading distances.

Longer range scanners have been proposed of a variety configurations. In U.S. Pat. No. 5,869,827 (Rando), multiple beam sources and distance sensing mechanisms are employed to provide an extended focus range. U.S. Pat. No. 5,641,958 (Rudeen et al.) discloses a system as employed in the PSC SP400LR scanner in which an LCD diffractive control module changes the waist location of the scanning beam. In U.S. Pat. No. 4,560,862 (Eastman et al.) the facets of a polygon mirror are provided with different curvatures such that the scan lines produced by the different facets are focused at varying distances. U.S. Pat. No. 5,475,207 (Bobba, Acosta et al.) discloses a variety of single and multiple source laser scanners, and single and multiple scan mechanisms for creating relatively dense scan patterns through multiple scan housing windows.

Typical scanners rely on the number of facets in the polygon mirror and the number of pattern mirrors to generate a certain number of scanning segments or scan lines. The number of pattern mirrors is limited by the size of the scanner housing.

Bar code scanners have also been proposed wherein the outgoing laser beam is focused by different areas of the focusing lens such as described in U.S. Pat. No. 5,565,668 (Reddersen et al.). This design permits the beam to be focused to more than one waist location and, in theory, to provide increased depth of field. Because the light from the out-of-focus beam is still present when the other beam is in focus there is the potential for reduced resolution for each zone.

SUMMARY OF THE INVENTION

The present invention is directed to a system for and a method of efficiently generating a dense pattern of scan lines. In a preferred configuration, multiple laser beams are formed and directed along offset paths onto a scanning mechanism such as a polygon mirror which scans the beams across pattern mirrors to generate simultaneous scan patterns out into the scan volume. Return light from both scan patterns are retrodirectively collected and redirected by a common collection element such as a collection lens. The collection lens focuses return light from the first beam onto a first detector and light from the second beam onto a second detector.

These multiple laser beams may be focused at different waist locations/distances. By arranging the outgoing beams in an offset condition, the collected light may focused to different locations because of the angular and/or axial offset condition.

BRIEF DESCRIPTION OF THE DRAWINGS

FIG. 6 is schematic diagram of a scanning system according to a second embodiment in which outgoing beams are angularly offset from each other;

FIG. 7 is a schematic diagram of a collection scheme for the scanning system of FIG. 6;

DETAILED DESCRIPTION OF THE PREFERRED EMBODIMENTS

Figure 1:
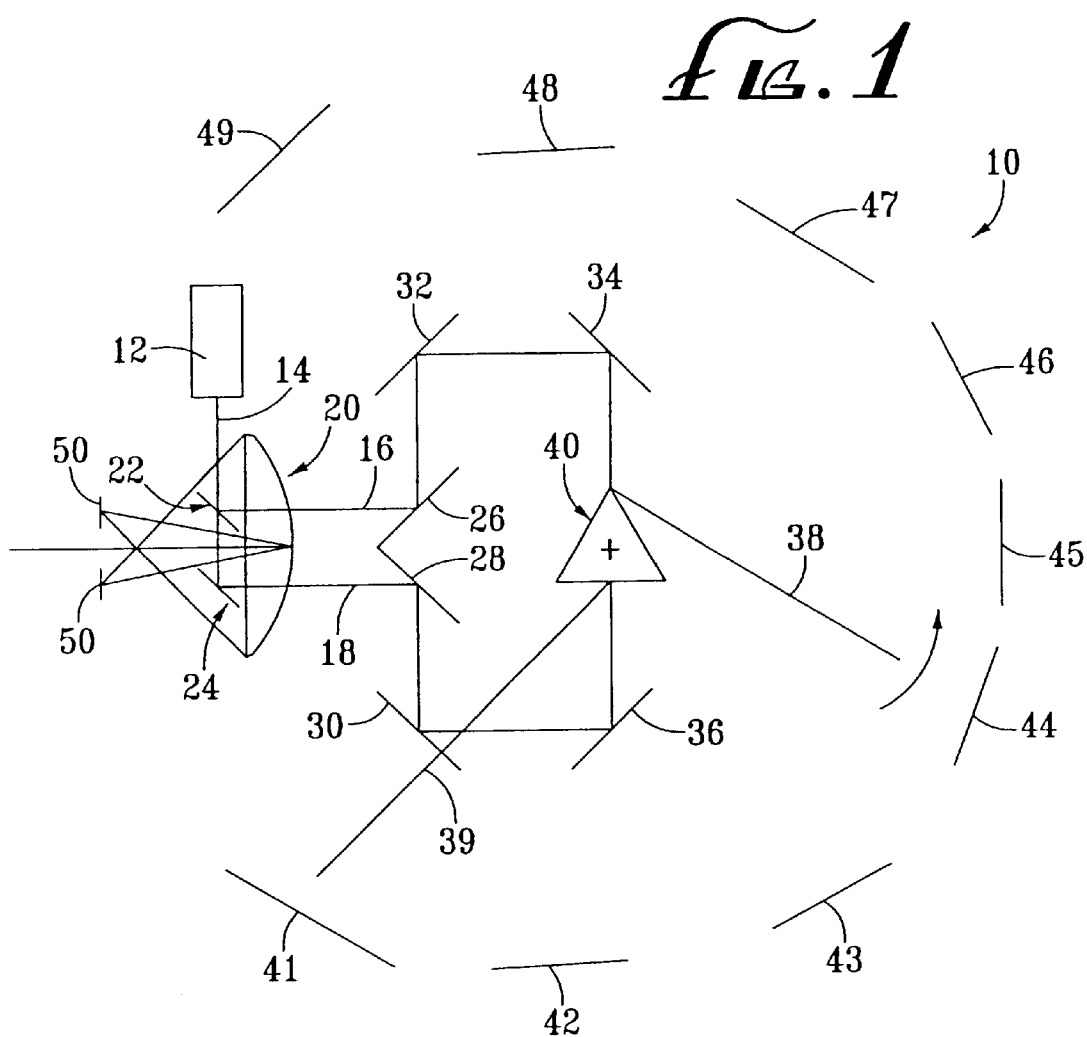
FIG. 1 is a schematic diagram illustrating a scanning system according to a first embodiment of the present invention.
Figure 2:
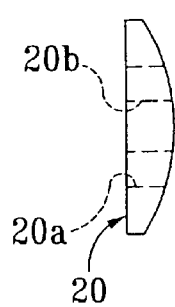
FIG. 2 is a detailed side view of the combination lens element of the system of FIG. 1.
Figure 3:
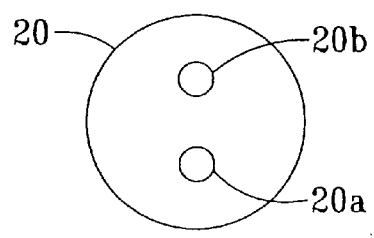
FIG. 3 is a front plan view of the combination lens element of the system of FIG. 2.

Preferred embodiments of the present invention will now be described with reference to the drawings. To facilitate description, any reference numeral representing an element in one figure will represent the same element in any other figure.

FIGS. 1–5 illustrate a first embodiment in which a scanning system 10 provides a wider reading range by producing scan beams with multiple focal regions. In system 10, a light source 12, such as a visible laser diode (VLD) produces a light beam 14 which is directed onto a beam splitter 22 which splits the beam 14 into two beam portions by reflecting a first portion (first reading beam 16) and transmitting a second portion (second reading beam 18). The first reading beam 16 reflected by the beam splitter 22 passes through channel 20b in the collection lens 20 while the second reading beam 18 passes through the beam splitter 22 and then is reflected by fold mirror 24 and directed through passage 20a in collection lens 20.

The first reading beam 16 is reflected by fold mirror 26, and then by fold mirror 32 and fold mirror 34 and directed onto facet wheel 40 whereby the beam is scanned across an angle creating a scan beam 38 directed across pattern mirrors 44, 45, 46, 47, 48, 49. Each pattern mirror 44–49 creates one or more scan lines directed into a scan volume as the scan beam 38 is reflected thereby. Simultaneously, the second reading beam 18 is directed to an opposite side of the polygon mirror 40 reflecting off fold mirror 28, fold mirror 30, and fold mirror 36 whereby the polygon mirror scans the second reading beam 18 over a scan angle producing a scan beam 39 across pattern mirrors 41, 42, 43, 44, 45, 46. As the scan beam 39 is scanned across one of the pattern mirrors 41–46, one or more scan lines is produced and directed into a scan volume from each pattern mirror. The scan lines may be produced either directly from a primary pattern mirror such as pattern mirror 41 or may be directed from a primary pattern mirror 41 onto a secondary pattern mirror or even tertiary pattern mirrors depending on the desired scan pattern.

The first reading beam 16 and the second reading beam 18 are axially offset from each other, passing through a single collection lens element 20. The system comprises a retro-directional collection system in which the reading beams reflecting or refracting off a target retrace their steps off the pattern mirrors 41–49, off the polygon mirror 40, off the fold mirrors 26–36, and onto the collection lens 20. Because of the offset nature of the reading beams 16, 18, return signal from reading beam 16 is primarily collected onto a first detector 50 and return signal generated from reading beam 18 is primarily collected onto detector 52.

Figure 4:
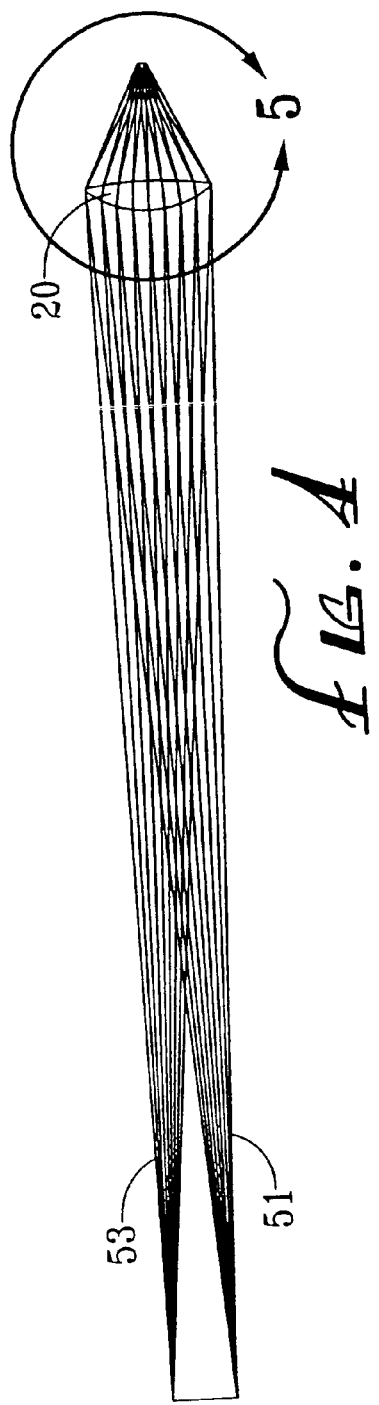
FIG. 4 is a schematic diagram illustrating collection scheme for the system of FIG. 1.
Figure 5:
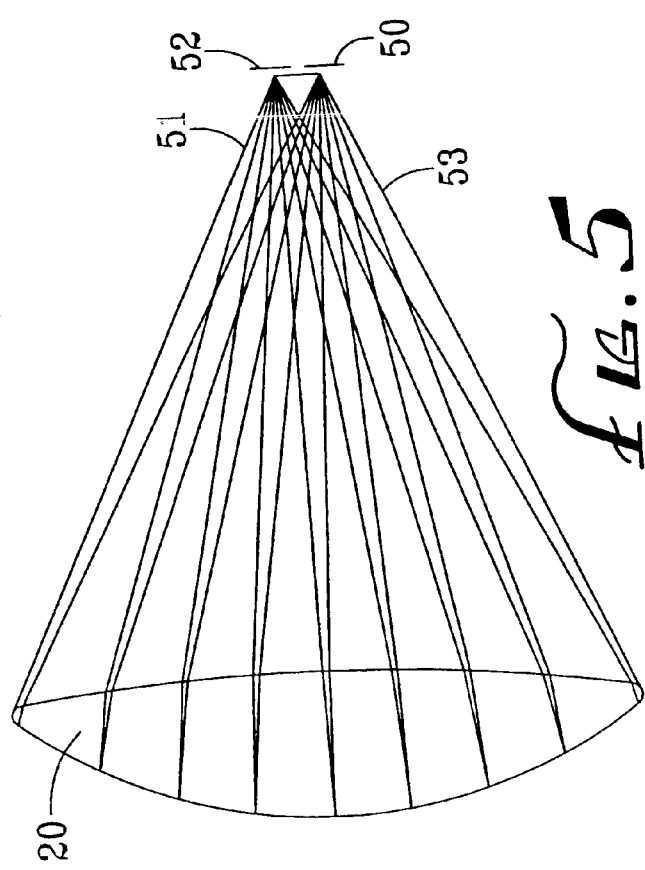
FIG. 5 is a detail of a portion of FIG. 4.

Thus as shown in FIGS. 4–5, the scanning beams 38, 39 simultaneously create two separate return signals 53, 51. The return signals 53, 51 are offset corresponding to the offset nature of the outgoing reading beams 16, 18. As the collection lens 20 focuses the two off axis cones of return light signal 53, 52, the focal points are focused offset from each other thereby enabling the return signals to be separately collected such that return signal 51 from the reading beam 18 is collected onto detector 52 and the return signal 51 from reading beam 16 is directed onto detector 50. The signal generated by the detectors 51, 52 are processed along parallel circuits as further described in detail below.

FIGS. 6–7 illustrates an alternate scanning system 80 in which a single light source 82 produces a beam which is split by a multifocal lens 84 into two non-parallel outgoing reading beams 86, 88. As shown in FIG. 6, the outgoing beam 86 is offset +4° from the outgoing axis 85 and the second outgoing beam 88 is offset –4° degrees from the axis 85. Thus, in this embodiment, the reading beams 86, 88 are angularly offset by a total of 8 degrees from each other. Preferably, the centers of curvature of the two focusing zones of the lens 84 are offset. The angular offset beams 86, 88 may additionally be axially offset as described in the previous embodiment.

Multifocal lens 84 also focuses the beams 86, 88 to different focal zones, reading beam 86 focused at a near range and reading beam 88 focused at a far range.

As shown in FIG. 7, return light from the far range reading beam is primarily focused by collection lens 90 onto a first detector 96 and return signal from near range reading beam 86 is focused onto a second detector 98. The detectors 96, 98 are not only axially offset but are also positioned at different distances from the collection lens 90. The off axis nature of the return signals combined with the different focal positions provide for the orientation of the detectors 96, 98. The detector 96 sends its collected signal to a far field analog circuit 97 which is designed to enhance processing of far field signals to compensate for the farther distance and lower power signal expected from the far field target. Signal produced by detector 98 is processed by a near field analog circuit 99 which is also designed to enhance collection for the near field signal.

The multifocal lens 84 may divide the optical beam from the laser diode 82 into equal beam portions or may divide the beam into non-equal portions producing a stronger signal beam for a far field reading beam 88 and a lower power signal for the near field reading beam 86. The multiple focus and offset reading beams 86, 88 may also be produced by separate beam sources such as two laser diodes, of the same or different optical power, the first laser diode with its focusing system producing a first reading beam 86 and the second laser diode and its focusing system producing the second reading beam 88.

FIGS. 8–13 illustrate a scanning system 100 according to a third embodiment. In this embodiment, the scanning system 100 is installed within a housing 105. A laser diode 102 produces an optical beam 104 which is split by a beam splitter 106. The beam splitter divides the beam 104 by reflecting a portion of the beam to generate a first reading beam 104a and transmitting a second portion of the beam to generate a second reading beam 104b. The first reading beam 104a is reflected through a channel 121 in the lower collection lens 120 and onto the polygon mirror 130. The second reading beam 104b is reflected by a fold mirror 108 through a passage 126 in the upper collection lens section 125 and onto the polygon mirror 130. In this embodiment, the reading beams 104a, 104b are axially offset such that they strike the polygon mirror at different axially separated points. In this respect, the polygon mirror facets may be disposed at the same angle of incidence relative to the incoming reading beams 104a, 104b or the facets portions may be arranged at different angles. The reading beams 104a, 104b are scanned by the polygon mirror 130 across a plurality of pattern mirrors 140, 142 bouncing either once or twice off of pattern mirrors 140, 142, 144, 146 and exiting out through the window 107.

Return light from the first reading beam 104a is collected by a collection lens 120, focusing the return cone of light 151 onto the first detector 160. Return light originating from the second reading beam 104b returning through collection lens section 120 is focused off-axis illustrated by cone of light 152 which misses the first detector 160. As such return signal from the second reading beam 104b (i.e. noise) does not reach the detector 160. Similarly, return light from the second reading beam 104b is collected by collection lens section 125, focusing the return cone of light 153 onto the second detector 162. Return light originating from the first reading beam 104a returning through the collection lens section 125 is focused off-axis illustrated by the cone of light 154 which is focused so as to miss the second detector 162. As such, return signal originating from the first reading beam 104a (i.e. noise) does not reach the second detector and thus does not interfere with the good signal 153 at the second detector 162.

Figure 10:
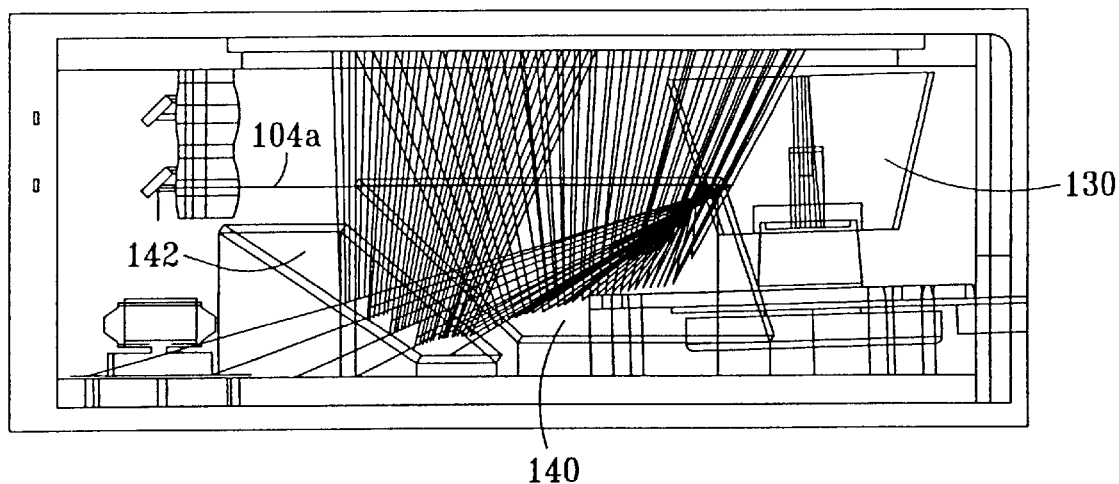
FIG. 10 is a detailed of the scanning system of FIG. 8 illustrating the pattern from the bottom source.
Figure 11:
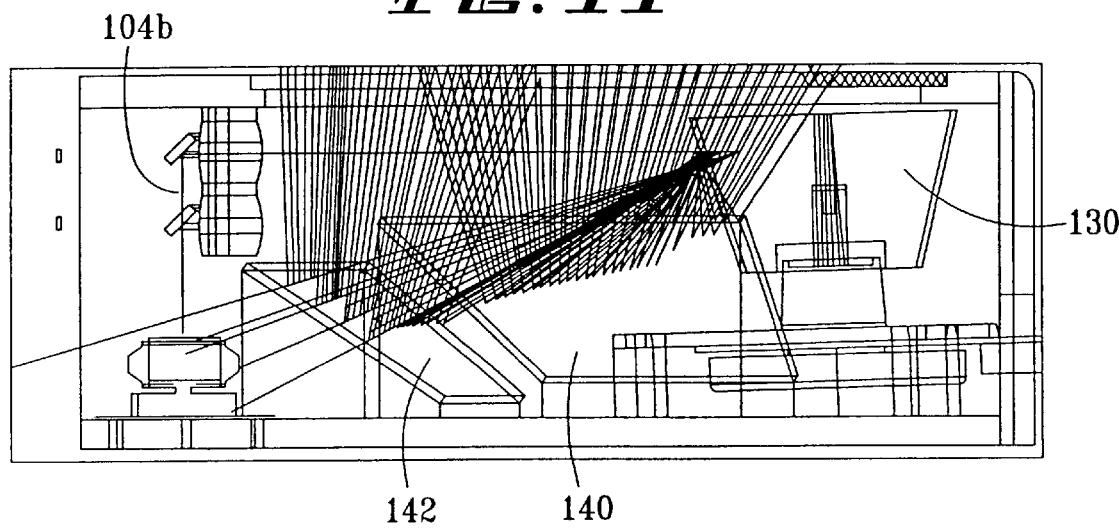
FIG. 11 is a detailed of the scanning system of FIG. 8 illustrating the pattern from the top source.

FIGS. 10–11 illustrate a dense scan pattern which may be generated by the multisource system 100. In this embodiment, the polygon mirror 130 has four mirror facets each oriented at a different angle so as to produce four different sets of scan lines as the scan beams traverse across the pattern mirrors (pattern mirrors 140, 142 being visible in these views) for each reading beam per rotation. FIG. 10 illustrates the bottom source pattern produced by reading beam 104a. FIG. 11 illustrates the top source pattern produced by reading beam 104b.

Figure 12:
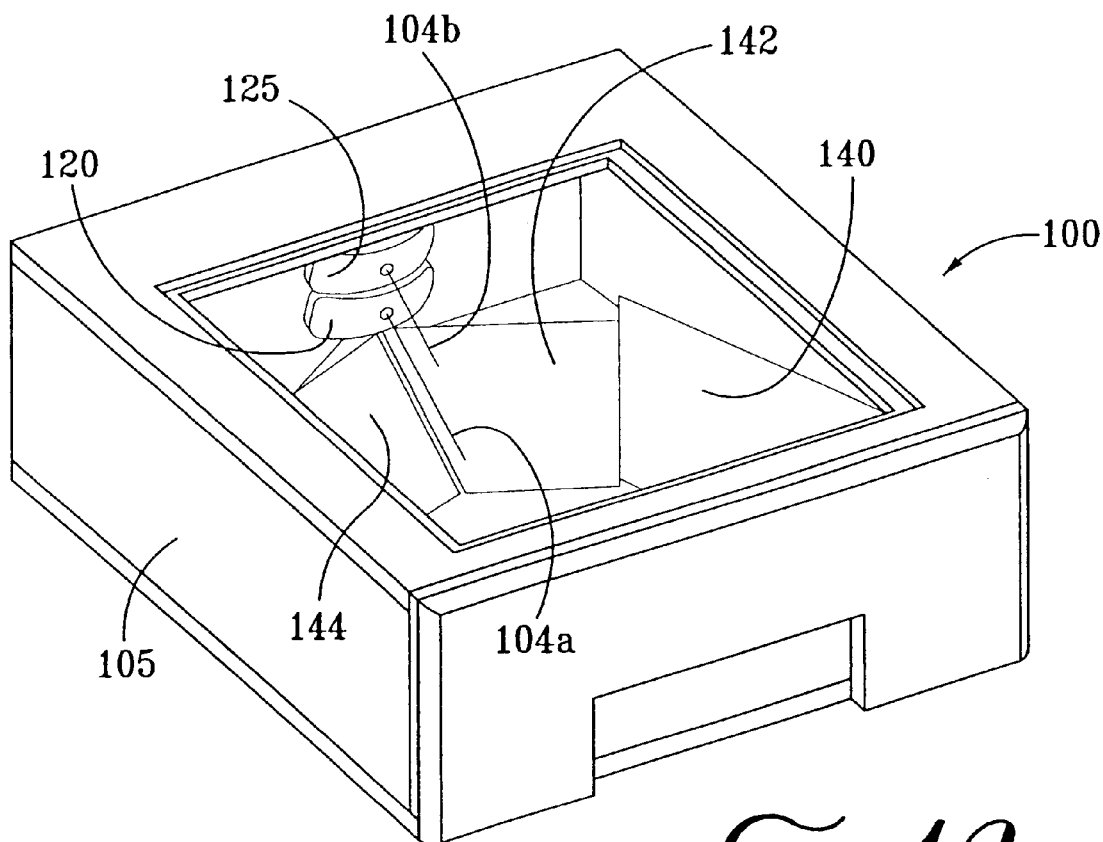
FIG. 12 is a perspective view of the scanning system of FIG. 8.
Figure 13:
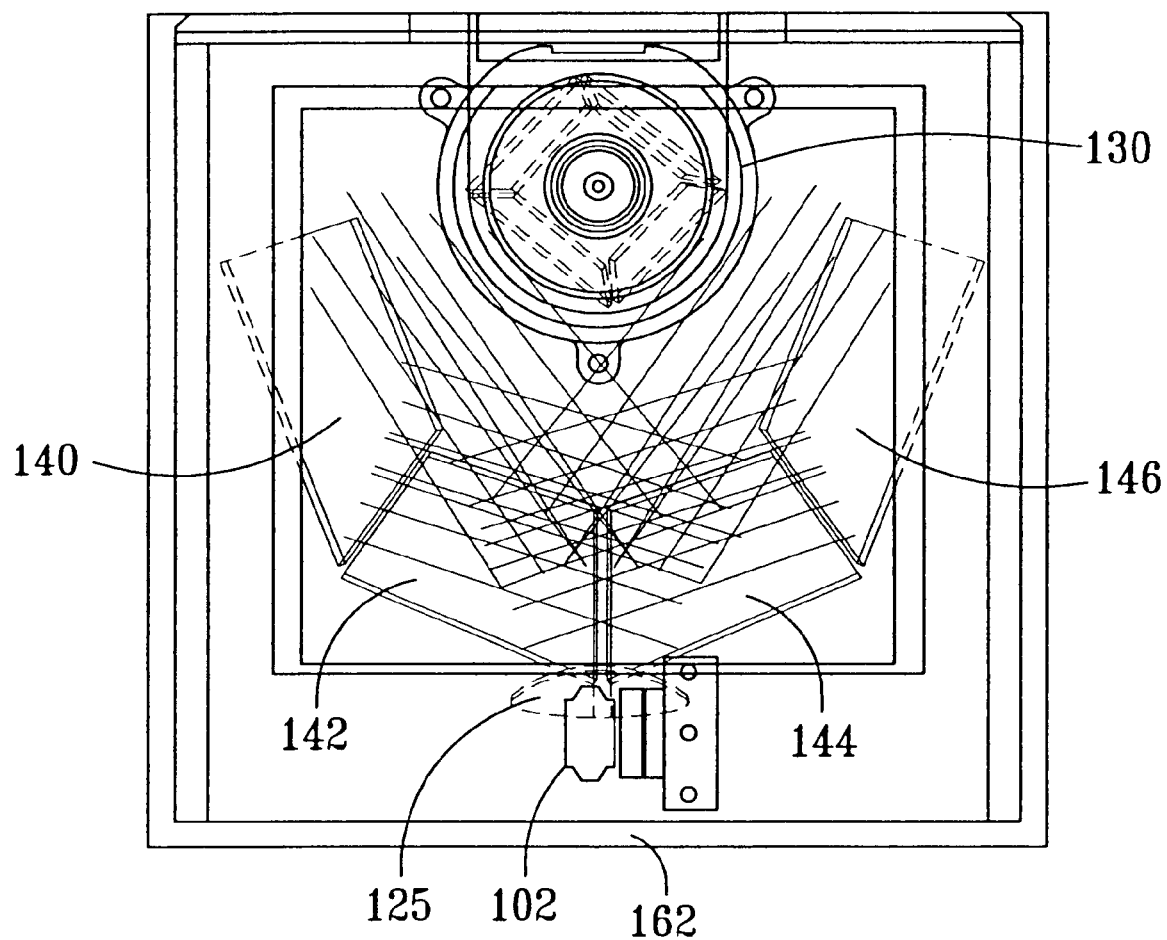
FIG. 13 is a top plan view of the scanning system of FIG. 8 illustrating the scan pattern.

FIG. 12 is a perspective view and FIG. 13 is a top plan view illustrating further optional features of the system 100 of FIGS. 8–11 in which the outgoing beam forming optics are designed to achieve different depths of field for each pattern. For example, the first reading beam 104a may be focused to a far range focal position and the second reading beam 104b may be focused to a near range focal position out from the housing 105. As in previous embodiments, the beams 104a, 104b may be produced by a single light source 102 combined with a beam splitter or may be produced by separate light sources such as by first and second laser diodes or other suitable light source. As shown in FIG. 13, a dense pattern of scan lines produced by the multiple source system is constructed in a compact and efficient manner. The first reading beam 104a is scanned by the polygon mirror 130 across pattern mirrors 140, 142, 144, 146 while simultaneously the second reading beam is scanned by the polygon mirror 130 across pattern mirrors 140, 142, 144, 146. Return light from far field focused beam 104a is collected by the collection lens section 120 onto detector 160 (positioned below detector 162 as in previous figure) and return light from near field focused beam 104b is collected by the collection lens section 125 onto detector 162.

Figure 14:
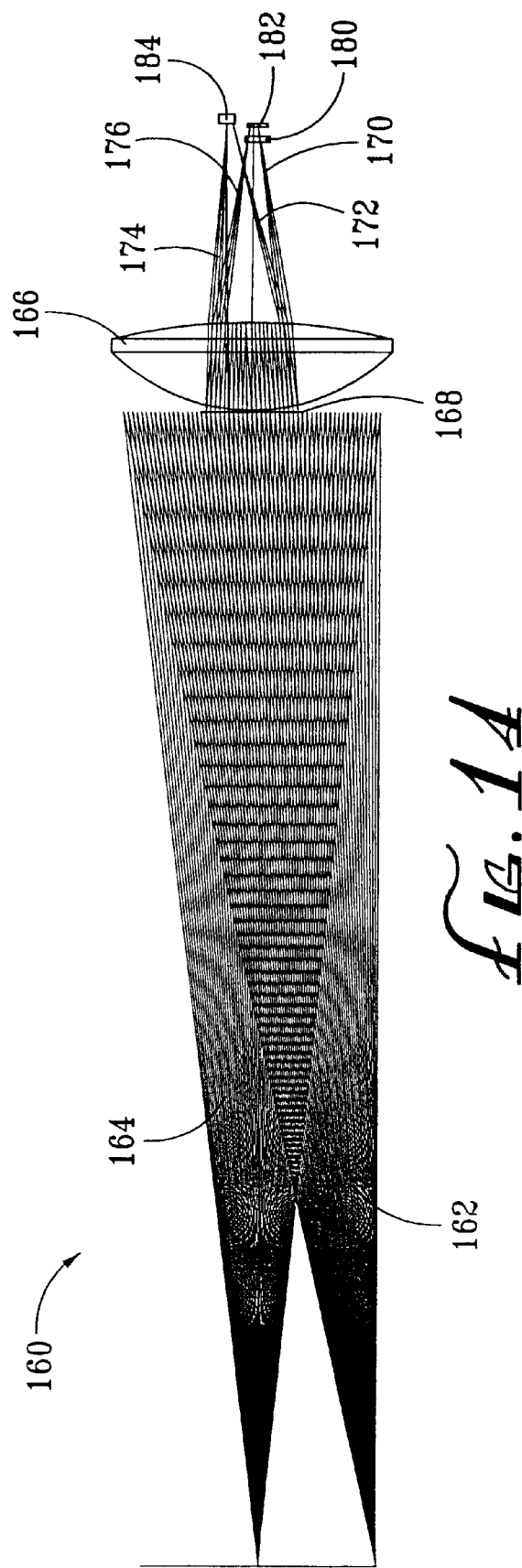
FIG. 14 is a schematic of a collection system according to the embodiment of FIG. 8.

FIG. 14 illustrates an alternate collection scheme 160. The collection scheme may be employed with multiple offset reading beams as previously described. In this system, the return signal 162 generated from a first reading beam is focused by the collection lens 166. Return signal 164 generated from a second reading beam is also collected by collection lens 166. The edges of the return signals 162, 164 are clipped by an aperture 168 positioned in front of or on the collection lens 166. Behind the lens 166 is an obscuration such as the mirror 24 and beam splitter 22 of FIG. 1 which would tend to block a central portion of the return signals 162, 164 from reaching the detectors. Due to the offset nature of the outgoing beams and the offset arrangement of the detectors 182, 184, return signal 162 is focused by the collection lens 166 such that focused portions 172, 174 are directed onto detector 184. Similarly return signal 164 is focused by the collection lens 166 such that focused portions 170, 176 are directed onto detector 182. A filter 180 may be disposed upstream of the detector 182 to filter out return signal of unwanted wavelength and/or incidence angle. The filter 180, or a separate filter of the same or different optical properties may be disposed in front of the other detector 184.

Figure 8:
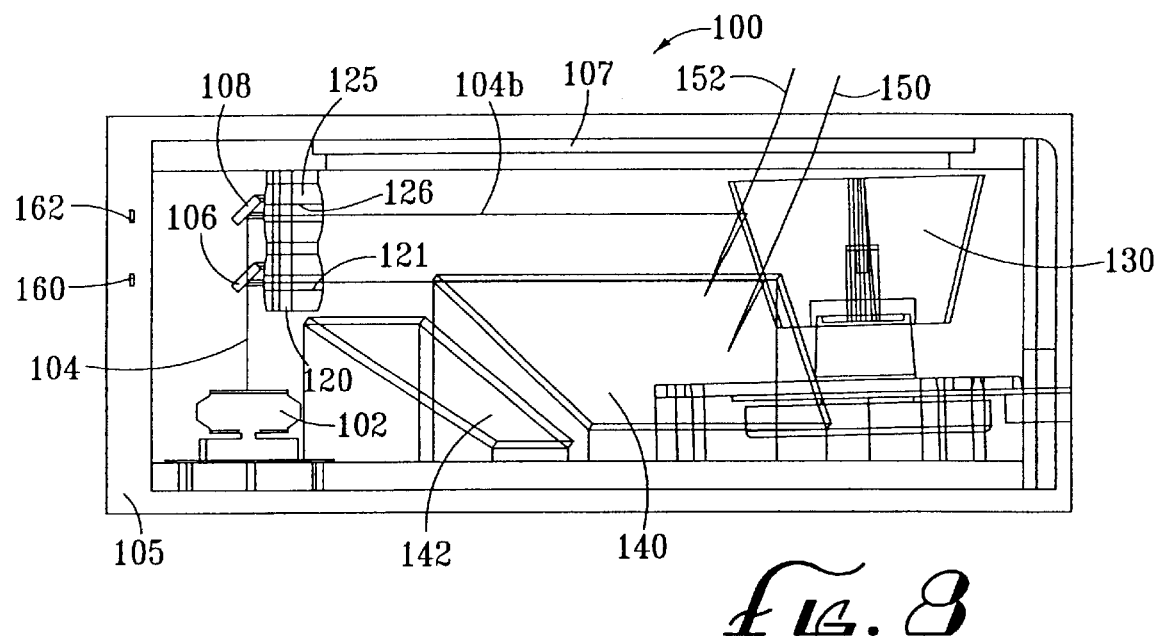
FIG. 8 is diagrammatic view of a scanning system according to a third embodiment.
Figure 9:
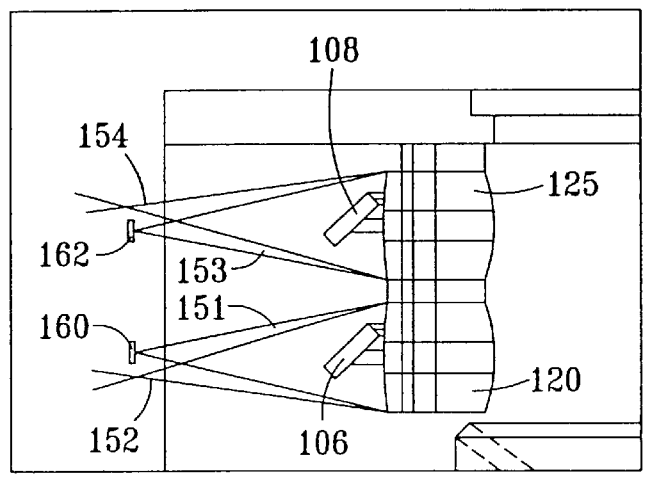
FIG. 9 is a detailed diagrammatic view of FIG. 8 illustrating the collection optics.
Figure 15:
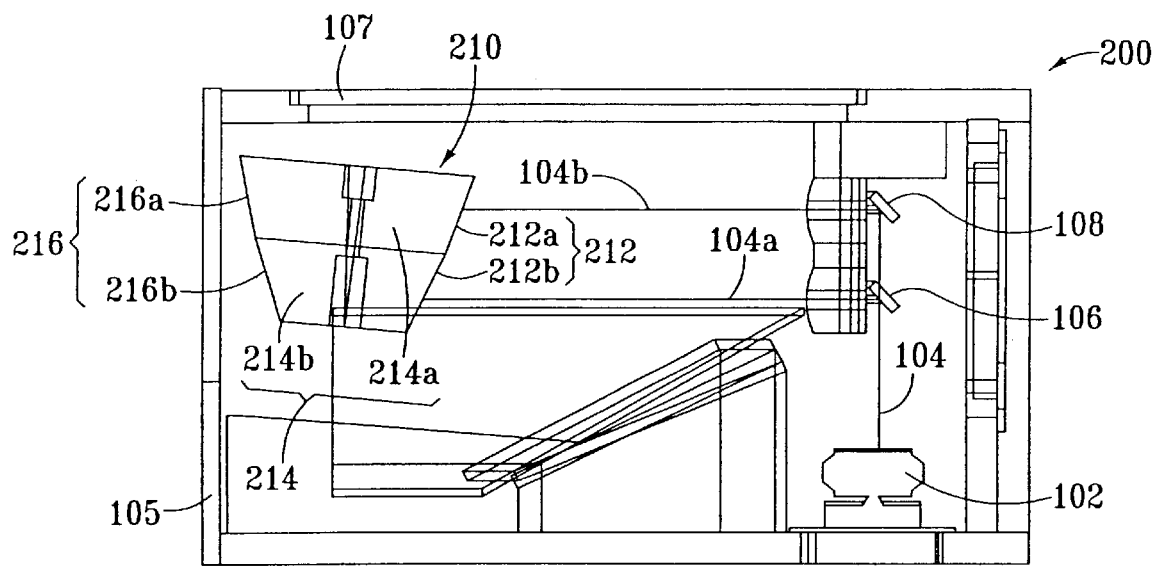
FIG. 15 is a diagrammatic view of a scanning system according to a fourth embodiment.
Figure 16:
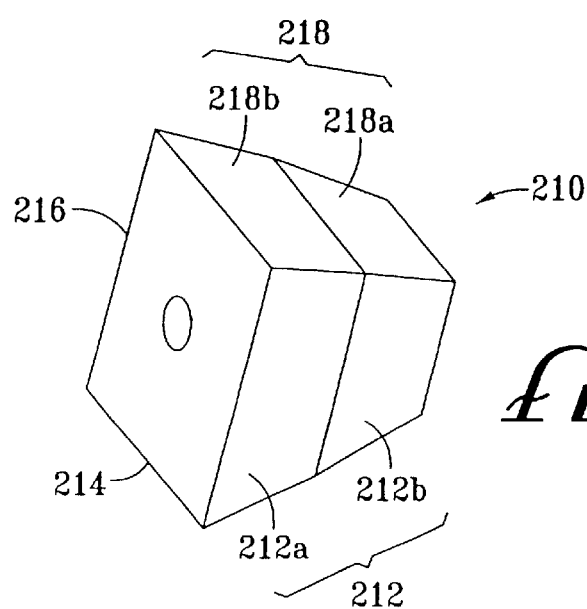
FIG. 16 illustrates details of the polygon mirror of the system of FIG. 15.

FIGS. 15–16 illustrate an alternate scanning system 200 which is similar to the system 100 of FIGS. 8–9 except for the alternate polygon mirror configuration 210. Polygon mirror 210 has four sides 212, 214, 216, 218. Each of the sides has mirror section 212a/212b, 214a/214b, 216a/216b, and 218a/218b. The remaining components of the system 200 of FIG. 15 are the same as the components of the system 100 of FIGS. 8–9 and are provided with the same element numerals. With respect to the polygon mirror 210, the facets are arranged at different angles such that the reading beams 104a, 104b are reflected along nonparallel paths when producing a scan beam during scanning. For example, the angular orientation of facet portion 212a reflecting upper beam 104b is at a different angular orientation than the facet portion 212b which scans lower reading beam 104a. This variation in facet angles on the polygon mirror 210 may provide for additional or otherwise varied scan line coverage in the scan volume.

In any of the described systems, the separation of the reading beams may be angular and/or axial and the offset may be either in the scanning axis or the non-scanning axis as illustrated in the various embodiments. Though the systems may be particularly useful for retrodirectional and fixed scanner systems, the systems may be applied to non-retrodirectional systems and to handheld scanning systems.

In the handheld scanning system application, the beam offset may preferably be in the scanning axis. Thus, the user may only see a single scan beam (due to the speed of the scan) as the scan lines produced by the two beams will appear to overlap.

A non-retrodirectional system may be employed with a cylindrical collection system where the beam offset is in the same direction as the cylindrical power. Alternately, the detectors may comprise long, thin detection elements constructed and arranged to correspond to the offset beam orientation.

Figure 17:
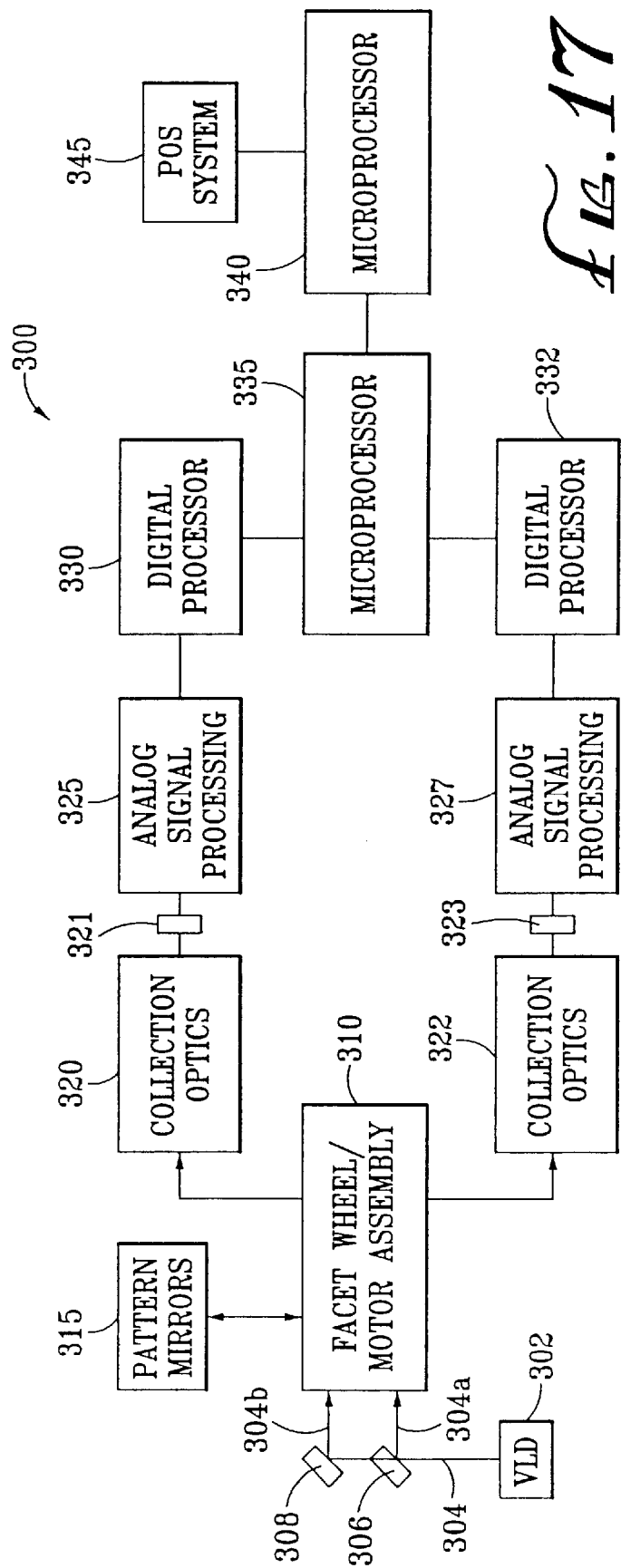
FIG. 17 is a schematic illustrating a processing method according to a first embodiment.
Figure 18:
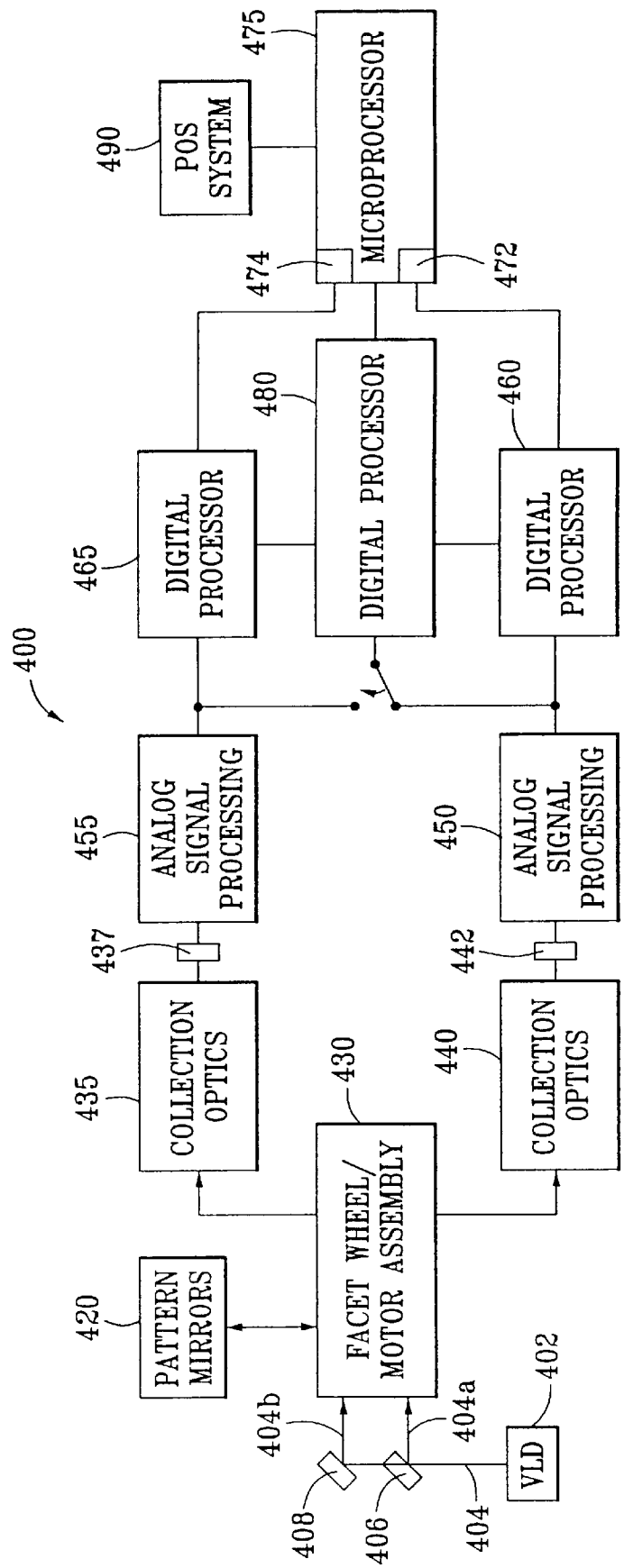
FIG. 18 is a schematic illustrating a processing method according to a second embodiment.
Figure 19:
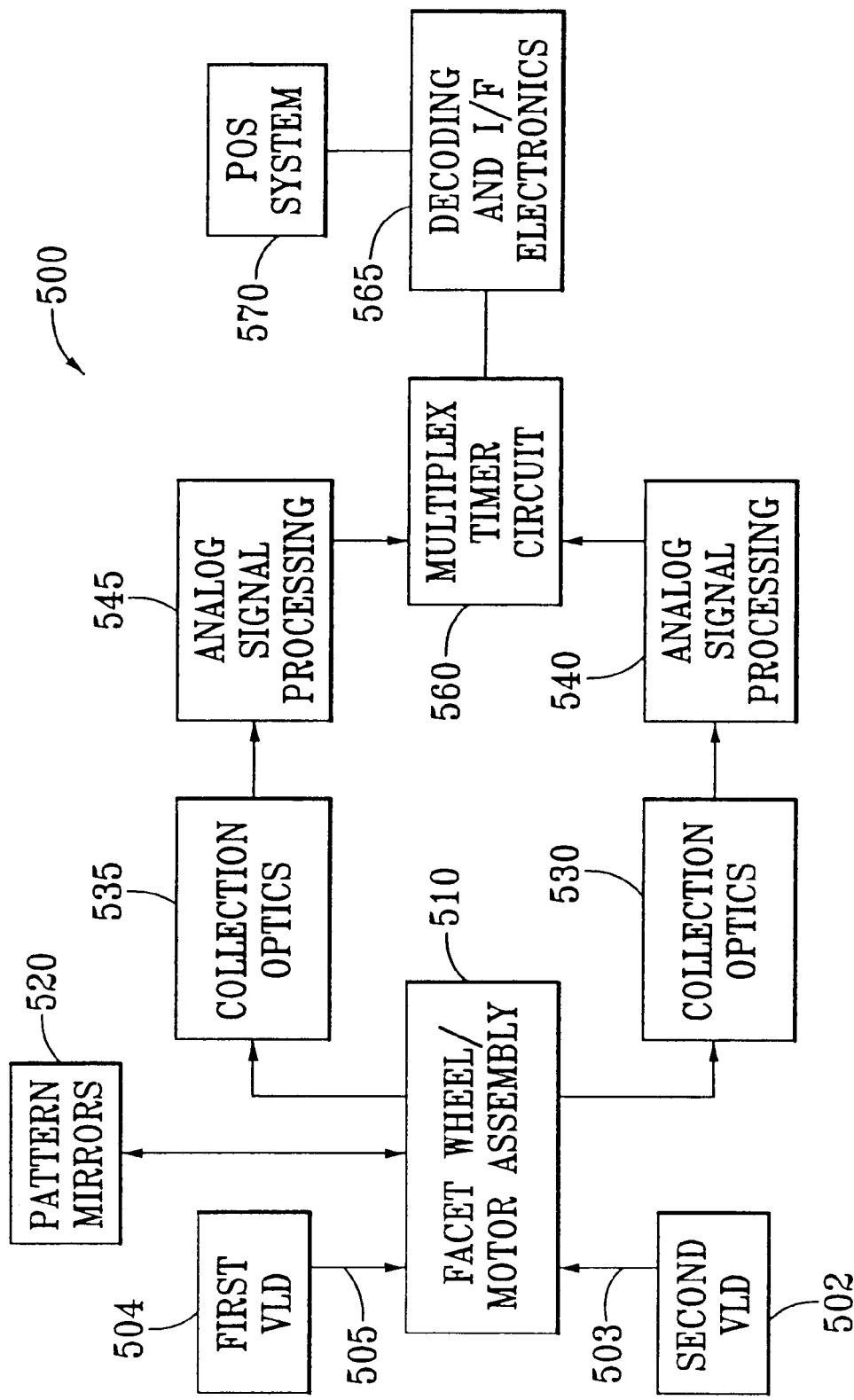
FIG. 19 is a schematic illustrating a processing method according to a third embodiment.

FIGS. 17–19 illustrate several schemes for processing the multiple signals from the dual collection embodiments described above.

FIG. 17 illustrates a system 300 which is single laser diode 302 produces an optical beam 304 onto a beam splitter 306. The beam splitter 306 divides the beam reflecting a portion of the beam, first reading 304a, onto the facet wheel 310 and transmitting a portion of the beam, second reading 304b, which is folded by a fold mirror 308 and directed onto the facet wheel 310. Reading beams 304a and 304b are scanned across pattern mirrors 315. Return signal is retrodirectionally collected off the polygon mirror 310 with separate signals collected by collection optics 320/322 onto detectors 321, 323. In the first processing channel or circuit, the light collected at detector 321 from reading beam 304b is processed by an analog signal processor 325 and then sent to the digital signal processor 330. Similarly, return signal collected by detector 323 from the reading beam 304a is processed by an analog signal processor 327 and then converted by digital processor 332.

The processed raw data from both digital processors 330, 332 is then input into a first microprocessor 335 where the signals are analyzed and processed together. This common processing allows for enhanced efficiency and scanning advantages. For example, a partial bar code scanned by a scan line generated from the upper reading beam 304b and collection optics 320 may be stitched together with a partial bar code scanned by a scan line generated from the bottom reading beam 304a and collection optics 322 to achieve a complete scan. A second microprocessor 340, which may be separate from or included within the first microprocessor 335, may optionally integrate data input from a weigh scale 197. Once processed, data from the processor 340 is output to an application system illustrated as the point of sale system 345. Suitable methods for assembling optical code information from partially scanned label segments are disclosed in U.S. Pat. No. 5,493,108 hereby incorporated by reference.

FIG. 18 illustrates another scanning system 400 with processing circuit schematics suitable for use in embodiments illustrated above. In the system 400, a laser diode 402 produces an optical beam 404 which is split by a beam splitter 406 reflecting a portion of the beam produce a first reading beam 404a and transmitting a second portion to produce a second reading beam 404b. The first reading beam 404a is directed onto the polygon mirror 430 and the second reading beam 404b is reflected by a fold mirror 408 onto the polygon mirror 430. The polygon mirror 430 scans the reading beams 404a, 404b across a plurality of pattern mirrors 420 to produce a desired scan pattern. Return signal is collected retrodirectionally by collection optics 435, 440 as in the previous embodiment such that return signal originating from reading beam 404a is collected onto a first detector 442 and return signal originating from upper reading beam 404b is collected onto second detector 437.

The separate collection optics permit the simultaneous scanning via the first and second reading beams 404a, 404b through the same window. Separate analog signal processors 450, 455 are provided for simultaneously processing the analog signals from the respective photodiodes 442, 437.

Each signal is then converted and processed in a digital processor 460, 465 and then input into the microprocessor 475 for final processing and transmittal to the point of sale system 490. FIG. 18 also illustrates an alternate processing method wherein the signals from the analog signal processors 460, 465 may be routed to a single digital processor 480, multiplexed by a switching mechanism 470. Alternately, a combination of the above two embodiments of FIG. 18 may be used. Buffers may be used in the above embodiments. For example, optional buffers 472, 474 may be provided to assist processor 475.

FIG. 19 is a flow chart of another light scanning and collecting processing scheme 500. A first (bottom) laser diode light source 502 and second (top) laser diode light source 504 generate light beams 503, 505 toward a respective portions of the polygon mirror 510. Scan beams from both the beams 503, 505 are reflected off the common polygon mirror 510 according to any of the previous embodiments. Return signal originating from bottom reading beam 503 is collected (primarily) by bottom collection optics 530 and return signal originating from top reading beam 505 is collected (primarily) by upper collection optics 535, with the signals processed in respective analog signal processing units 540, 545 and then input into a multiplex timer circuit 560 so that the bar code signals from the top and bottom may be successively combined and transmitted to the decoding I/F electronics unit 565. This common processing allows for enhanced efficiency and scanning advantages similar to the previous embodiment. Once processed, data from the processor 565 is output to the point of sale system 570.

The particular processing scheme will depend upon the state of processors and the configuration of the system. The processing scheme illustrated in FIG. 17, may be particularly suited for a configuration of FIGS. 6–7 or FIG. 12 or in the other embodiments. In the system 300 each detector has its own signal processor, the bandwidth and gain can be optimized for each focusing zone. At any one time, there would be one data stream (corresponding to a bar code signal) for each signal processor 332, 330. Each data stream would come into the microprocessor 335 having been digitized and decoded in parallel. This system 500 having parallel collecting and processing channels/circuits advantageously permits, for any scan, all the zones to be decoded concurrently and does not require multiplexing between scans so snappiness is improved over the multiplex systems such as illustrated in FIG. 19.

The above examples illustrate two beam systems, however the systems may accommodate more than two beams (example 3 or more) such that return signals from 2, 3 or more detectors are each digitized and decoded in parallel channels and then the preprocessed data streams then combined in a microprocessor. Additional microprocessor speed may be required if more data strings are added, but the optical system architecture will remain basically the same.

Thus the present invention has been set forth in the form of its preferred embodiments. It is nevertheless intended that modifications to the disclosed scanning systems may be made by those skilled in the art without altering the essential inventive concepts set forth herein.

What is claimed is:

1. A method of scanning an item in a scan volume, comprising the steps of
    generating first and second light beams along first and second offset outgoing beam paths;
    locating a scanning mechanism in the outgoing beam paths;
    scanning the first and second light beams with the scanning mechanism toward a target;
    collecting return light from the target onto a first detector and a second detector;
    arranging the first detector and the second detector offset to collect primarily return signal originating from the first light beam onto the first detector and collect primarily return signal originating from the second light beam onto the second detector;
    focusing the first light beam to a near field waist location;
    focusing the second light beam to a far field waist location;
    adjusting processing of the return signal from the first detector to enhance processing of near field signals;
    adjusting processing of the return signal from the second detector to enhance processing of far field signals.

2. A method according to claim 1 further comprising scanning the first and second light beams via a common polygon mirror.

3. A method according to claim 1 further comprising retrodirectively collecting return light from the target onto the first detector and the second detector.

4. A method according to claim 1 further comprising
    scanning the first and second light beams with the scanning mechanism across a set of pattern mirrors and out through a window toward the target.

5. A method according to claim 1 further comprising
    generating a laser beam and splitting the laser beam with a beam splitter to generate the first and second light beams.

6. A method according to claim 1 further comprising
    generating the first light beam with a first laser diode and generating the second light beam with a second laser diode.

7. A method according to claim 1 further comprising
    processing return signal from the first detector along a first processing channel to produce a first data stream and processing return signal from the second detector along a second channel to produce a second data stream;
    combining the first and second data streams in a common processor.

8. A method according to claim 1 further comprising
    directing the first and second light beams along first and second axially offset outgoing beam paths.

9. A method according to claim 1 wherein the method comprises scanning an encoded indicia, the method further comprising
    detecting with the first detector a portion of the indicia which is less than the entire indicia and producing a first signal corresponding to reflected light from said portion;
    detecting with the second detector detects another portion of the indicia which is less than the entire indicia and producing a second signal corresponding to reflected light from said another portion;
    combining said first signal and said second signal to fully decode the information contained on the indicia.

10. A method according to claim 1 further comprising
    directing the first and second light beams along first and second angularly offset outgoing beam paths.

11. A method according to claim 1 further comprising
    directing the first and second light beams along first and second angularly and axially offset outgoing beam paths.

12. A scanning system comprising a scanning mirror mechanism;

a multiple beam light source, comprising a laser light source, a beam splitter and a fold mirror, for producing a first light beam and a second light beam, the light beams directed onto the polygon mirror along offset beam paths, the scanning mirror mechanism scanning the first and second light beams across a target;

a first detector and a second detector;

a collection system comprising a collection lens element for collecting return light from the target onto a first detector and a second detector such that return signal originating from the first light beam is primarily directed onto the first detector and return signal originating from the second light beam is primarily directed onto the second detector, wherein the beam splitter and the fold mirror are mounted adjacent a rear side of the collection lens element.

13. A scanning system according to claim 12 wherein the first light beam is focused to a far range and the second light beam is focused to a near range, where the second detector is positioned at a distance from the collection lens which is greater than a distance by which the first detector is positioned from the collection lens.

14. A scanning system according to claim 12 wherein the beam splitter and fold mirror are mounted to the collection lens element.

* * * * *

UNITED STATES PATENT AND TRADEMARK OFFICE
CERTIFICATE OF CORRECTION

PATENT NO.   : 6,290,135 B1
DATED        : September 18, 2001
INVENTOR(S)  : Acosta et al.

It is certified that error appears in the above-identified patent and that said Letters Patent is hereby corrected as shown below:

<u>Title page,</u>
References Cited, U.S. PATENT DOCUMENTS, insert the following:

| -- | 4,591,242 | 5/1986  | Broockman et al. | 359/19     |    |
|----|-----------|---------|------------------|------------|----|
|    | 5,361,158 | 11/1994 | Tang             | 235/462.4  |    |
|    | 5,475,207 | 12/1995 | Bobba et al.     | 235/462.4  |    |
|    | 5,491,328 | 2/1996  | Rando            | 235/462.14 |    |
|    | 5,565,668 | 10/1996 | Reddersen et al. | 235/462.22 |    |
|    | 5,693,930 | 12/1997 | Katoh et al.     | 235/462.35 |    |
|    | 5,719,385 | 2/1998  | Wike, Jr. et al. | 235/462.09 |    |
|    | 5,869,827 | 2/1999  | Rando            | 235/462.4  |    |
|    | 5,945,670 | 8/1999  | Rudeen           | 250/235    | -- |

Signed and Sealed this

Thirtieth Day of July, 2002

*Attest:*

*Attesting Officer*

JAMES E. ROGAN
*Director of the United States Patent and Trademark Office*